(12) United States Patent
Liang

(10) Patent No.: US 10,698,177 B2
(45) Date of Patent: Jun. 30, 2020

(54) LENS ASSEMBLY

(71) Applicants: SINTAI OPTICAL (SHENZHEN) CO., LTD., ShenZhen, Guangdong Province (CN); ASIA OPTICAL CO., INC., Taichung (TW)

(72) Inventor: Yuan Fan Liang, Taichung (TW)

(73) Assignees: SINTAI OPTICAL (SHENZHEN) CO., LTD., ShenZhen (CN); ASIA OPTICAL CO., INC., Taichung (TW)

(*) Notice: Subject to any disclaimer, the term of this patent is extended or adjusted under 35 U.S.C. 154(b) by 98 days.

(21) Appl. No.: 16/005,703

(22) Filed: Jun. 12, 2018

(65) Prior Publication Data

US 2019/0101726 A1   Apr. 4, 2019

(30) Foreign Application Priority Data

Sep. 29, 2017   (CN) .......................... 2017 1 0902823

(51) Int. Cl.
| | | |
|---|---|---|
| G02B 9/60 | (2006.01) | |
| G02B 13/18 | (2006.01) | |
| G02B 27/00 | (2006.01) | |
| G02B 7/10 | (2006.01) | |
| G02B 13/00 | (2006.01) | |

(52) U.S. Cl.
CPC .................. *G02B 9/60* (2013.01); *G02B 7/10* (2013.01); *G02B 13/0045* (2013.01); *G02B 27/0037* (2013.01)

(58) Field of Classification Search
CPC ........ G02B 9/60; G02B 7/10; G02B 13/0045; G02B 27/0037
USPC .......................... 359/714, 753, 763, 764, 767
See application file for complete search history.

(56) References Cited

U.S. PATENT DOCUMENTS 4,704,011 A * 11/1987 Mercado ................... G02B 9/60
                                                                 359/768
2017/0184815 A1* 6/2017 Wang ..................... G02B 5/005

* cited by examiner

*Primary Examiner* — William Choi
(74) *Attorney, Agent, or Firm* — Mark M. Friedman

(57) ABSTRACT

A lens assembly includes a first lens, a second lens, a third lens, a fourth lens, and a fifth lens arranged along an optical axis in order from an object side to an image side. The first lens is a meniscus lens with positive refractive power, and an object-side surface of the first lens is convex. The second lens is a lens with positive refractive power, and an object-side surface of the second lens is convex. The third lens is a lens with negative refractive power, and an object-side surface and an image-side surface of the third lens are concave. The fourth lens is a meniscus lens with negative refractive power. The fifth lens is a lens with positive refractive power, and an object-side surface of the fifth lens is convex.

18 Claims, 15 Drawing Sheets

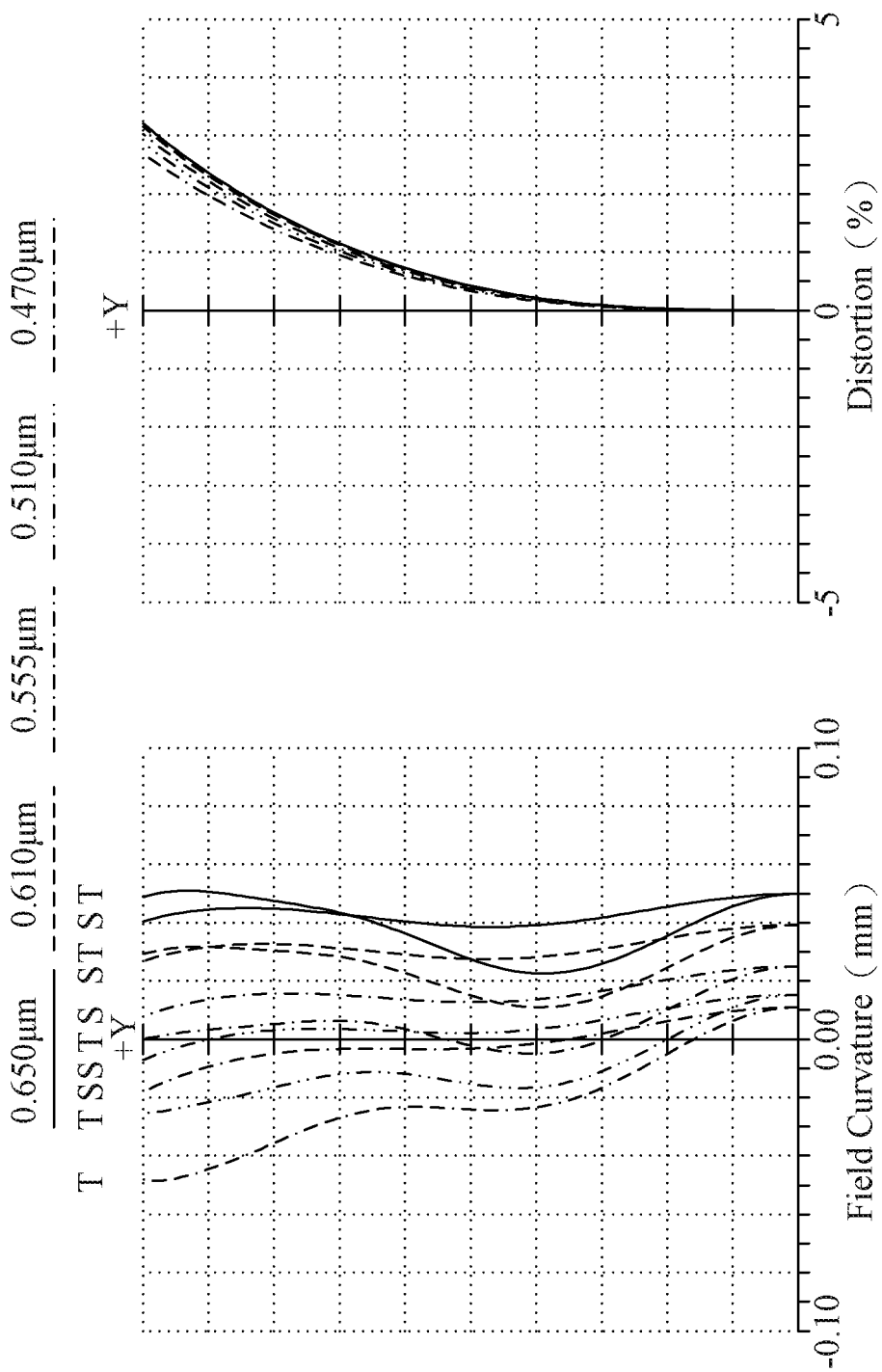

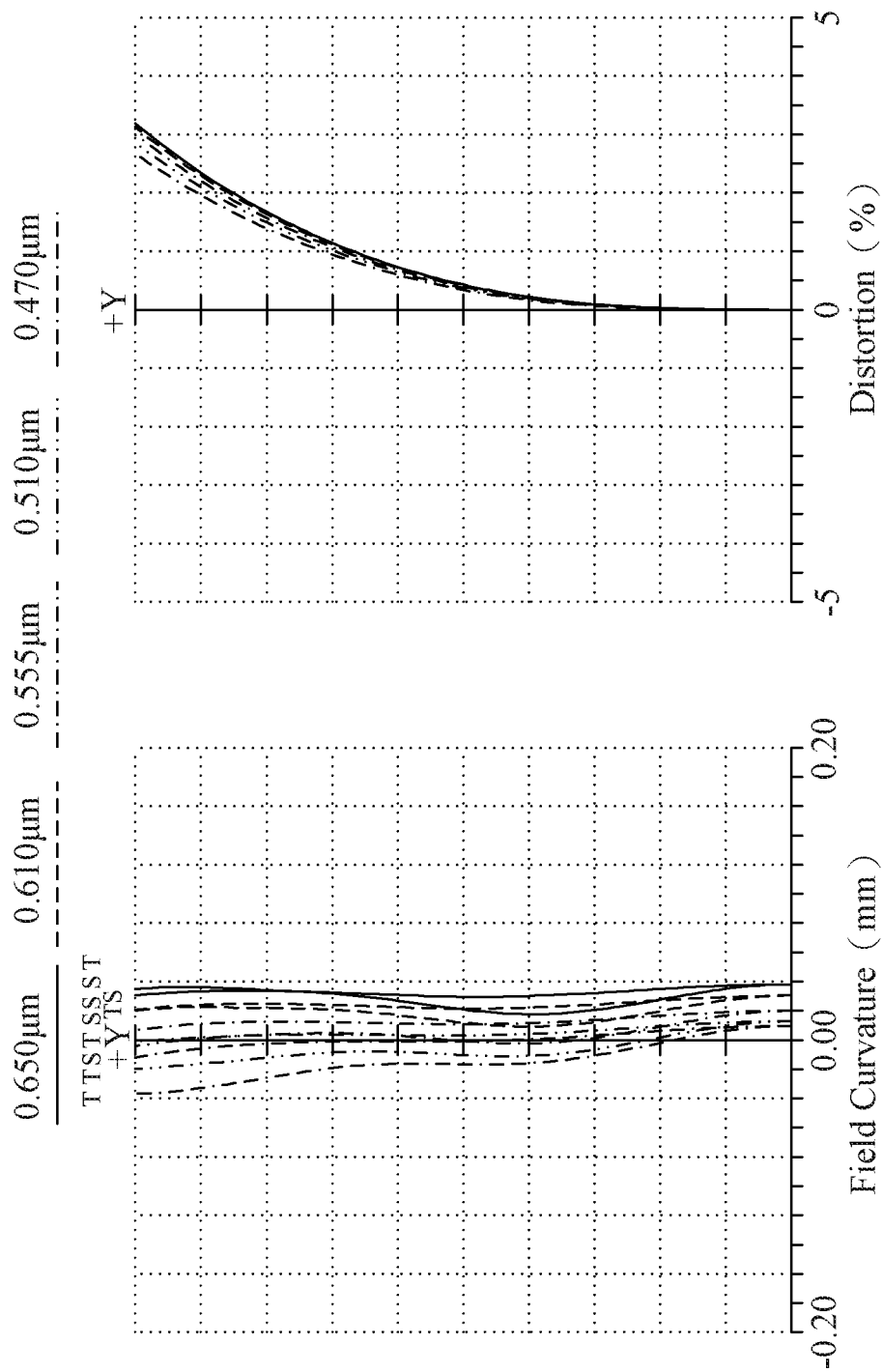

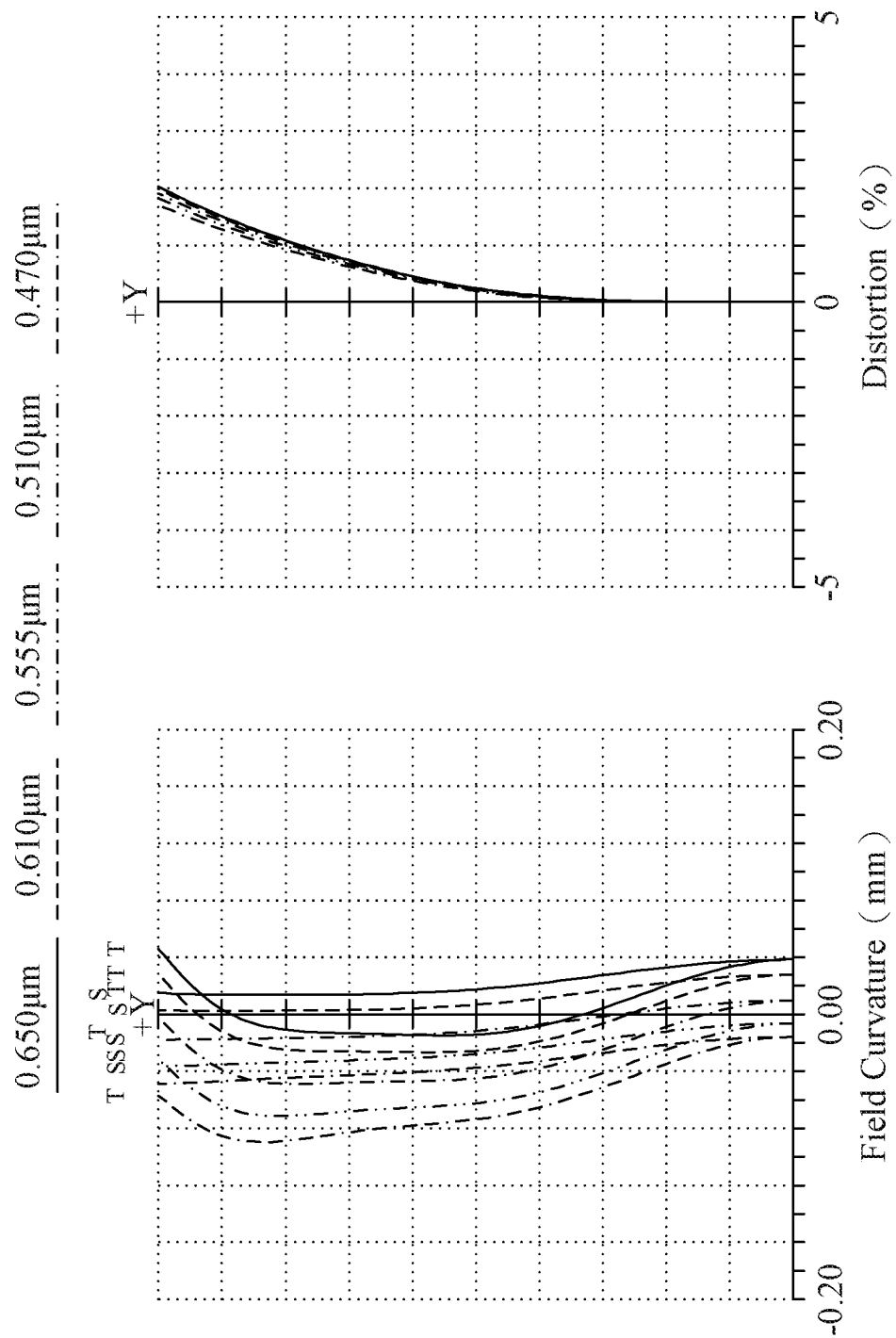

LENS ASSEMBLY

TECHNICAL FIELD OF THE DISCLOSURE

The present disclosure relates to a lens assembly, and more particularly, to a lens assembly characterized by a long focal length and a short total length of camera.

BACKGROUND OF THE DISCLOSURE

Nowadays, electronic products, equipped with cameras in the market, mostly focus on wide viewing angle and short object distance. If a person wants to capture an image of a distanced small object, optical designs of these cameras cannot meet such requirements. A camera with a telescopic capacity generally uses a multi-group zoom lens design and is equipped with spherical lenses. Such a structure leads the camera to occupy a large volume, which is not beneficial for small-size designs. Accordingly, existing optical systems cannot meet the average customers' requirements in pursuing functional and convenient photographing experiences.

SUMMARY OF THE DISCLOSURE

The objective of the present disclosure is to provide a lens assembly, which is characterized by a long focal length and a short total length of camera, and possesses an excellent optical performance.

In an aspect, the present disclosure provides a lens assembly including, in order from an object side to an image side along an optical axis: a first lens, a second lens, a third lens, a fourth lens, and a fifth lens. The first lens is a meniscus lens with positive refractive power, and has an object-side surface being convex and an image-side surface being concave. The second lens is a convex lens with positive refractive power. The third lens is a lens with negative refractive power. The fourth lens is a lens with negative refractive power. The fifth lens is a lens with positive refractive power, and has an object-side surface being convex.

In another aspect, the present disclosure provides a lens assembly including, in order from an object side to an image side along an optical axis: a first lens, which is a meniscus lens with positive refractive power; a second lens, which is a lens with positive refractive power, in which an object-side surface of the second lens is convex; a third lens, which is a lens with negative refractive power, in which an object-side surface of the third lens is concave and an image-side surface of the third lens is concave; a fourth lens, which is a meniscus lens with negative refractive power; and a fifth lens, which is a lens with positive refractive power, in which an object-side surface of the fifth lens is convex, wherein the lens assembly satisfies the following condition:

$$0 < \frac{TTL}{EFL} < 1,$$

wherein TTL is a total length of the lens assembly and EFL is an effective focal length of the lens assembly.

In an embodiment, the object-side surface of the first lens is convex and the image-side surface of the first lens is concave, the object-side surface of the fourth lens is concave.

In an embodiment, an image-side surface of the second lens is convex, an image-side surface of the forth lens is convex, and an image-side surface of the fifth lens is convex.

In an embodiment, an image-side surface of the second lens is concave, an image-side surface of the forth lens is concave, and an image-side surface of the fifth lens is concave.

In an embodiment, the image-side surface of the third lens and an object-side surface of the fourth lens are concave surfaces opposite to each other.

In an embodiment, the lens assembly further satisfies the following condition:

$$0.2 < \left|\frac{f_1}{EFL}\right| < 1,$$

wherein $f_1$ is a focal length of the first lens and EFL is an effective focal length of the lens assembly.

In an embodiment, the lens assembly further satisfies the following condition:

$$0.2 < \frac{BFL}{TTL} < 1,$$

wherein BFL is a distance between an image-side surface of the fifth lens and an image plane along the optical axis and TTL is a total length of the lens assembly.

In an embodiment, the lens assembly further satisfies the following condition:

$$2 < \left|\frac{v_1}{v_5}\right| < 3,$$

wherein $v_1$ is an Abbe number of the first lens and $v_5$ is an Abbe number of the fifth lens.

In an embodiment, at least one surface of each of the first lens, the second lens, the third lens, the fourth lens, and the fifth lens is an aspheric surface.

In an embodiment, the lens assembly further comprises an aperture stop disposed between the object side and the second lens.

In still another aspect, the present disclosure provides a lens assembly including, in order from an object side to an image side along an optical axis: a first lens, which is a meniscus lens with positive refractive power; a second lens, which is a lens with positive refractive power, in which an object-side surface of the second lens is convex; a third lens, which a lens with negative refractive power, in which an object-side surface of the third lens is concave and an image-side surface of the third lens is concave; a fourth lens, which is a meniscus lens with negative refractive power; and a fifth lens, which is a lens with positive refractive power, in which an object-side surface of the fifth lens is convex, wherein the lens assembly satisfies the following condition:

$$0.2 < \left|\frac{f_1}{EFL}\right| < 1,$$

wherein $f_1$ is a focal length of the first lens and EFL is an effective focal length of the lens assembly.

In an embodiment, the object-side surface of the first lens is convex and the image-side surface of the first lens is concave, the object-side surface of the fourth lens is concave.

In an embodiment, an image-side surface of the second lens is convex, an image-side surface of the forth lens is convex, and an image-side surface of the fifth lens is convex.

In an embodiment, an image-side surface of the second lens is concave, an image-side surface of the forth lens is concave, and an image-side surface of the fifth lens is concave.

In an embodiment, the image-side surface of the third lens and an object-side surface of the fourth lens are concave surfaces opposite to each other.

In an embodiment, the lens assembly further satisfies the following condition:

$$0.2 < \frac{BFL}{TTL} < 1,$$

wherein BFL is a distance between an image-side surface of the fifth lens and an image plane along the optical axis and TTL is a total length of the lens assembly.

In an embodiment, the lens assembly further satisfies the following condition:

$$0 < \frac{TTL}{EFL} < 1,$$

wherein TTL is a total length of the lens assembly and EFL is an effective focal length of the lens assembly.

In an embodiment, the lens assembly further satisfies the following condition:

$$2 < \left|\frac{v_1}{v_5}\right| < 3,$$

wherein $v_1$ is an Abbe number of the first lens and $v_5$ is an Abbe number of the fifth lens.

In an embodiment, at least one surface of each of the first lens, the second lens, the third lens, the fourth lens, and the fifth lens is an aspheric surface.

In an embodiment, the lens assembly further comprises an aperture stop disposed between the object side and the second lens.

The lens assembly of the present disclosure is characterized by a long focal length. With telescopic capability, the lens assembly can also reduce aberration, improve resolution, effectively control the total length, and meet the requirements of small size.

BRIEF DESCRIPTION OF THE DRAWINGS

FIGS. 2A to 2E are diagrams illustrating longitudinal aberration, lateral color, field curvature, distortion, and modulation transfer function (MTF) according to the first embodiment of the present disclosure, respectively.

FIGS. 4A to 4E are diagrams illustrating longitudinal aberration, lateral color, field curvature, distortion, and modulation transfer function (MTF) according to the second embodiment of the present disclosure, respectively.

FIGS. 6A to 6E are diagrams illustrating longitudinal aberration, lateral color, field curvature, distortion, and modulation transfer function (MTF) according to the third embodiment of the present disclosure, respectively.

DETAILED DESCRIPTION OF THE DISCLOSURE

To make the objectives, technical schemes, and technical effects of the present disclosure more clearly and apparently, the present disclosure will be described in details below using embodiments in conjunction with the appending drawings.

The lens assembly provided in the present disclosure is characterized by a long focal length and small size. The lens assembly is applicable to various image capturing devices equipped with cameras. For example, the image capturing devices can be personal information terminals (e.g., cell phones, smartphones, and tablets), wearing devices, monitoring apparatuses, IP CAMs, dashboard cameras, or rear view camera apparatuses.

Figure 1:
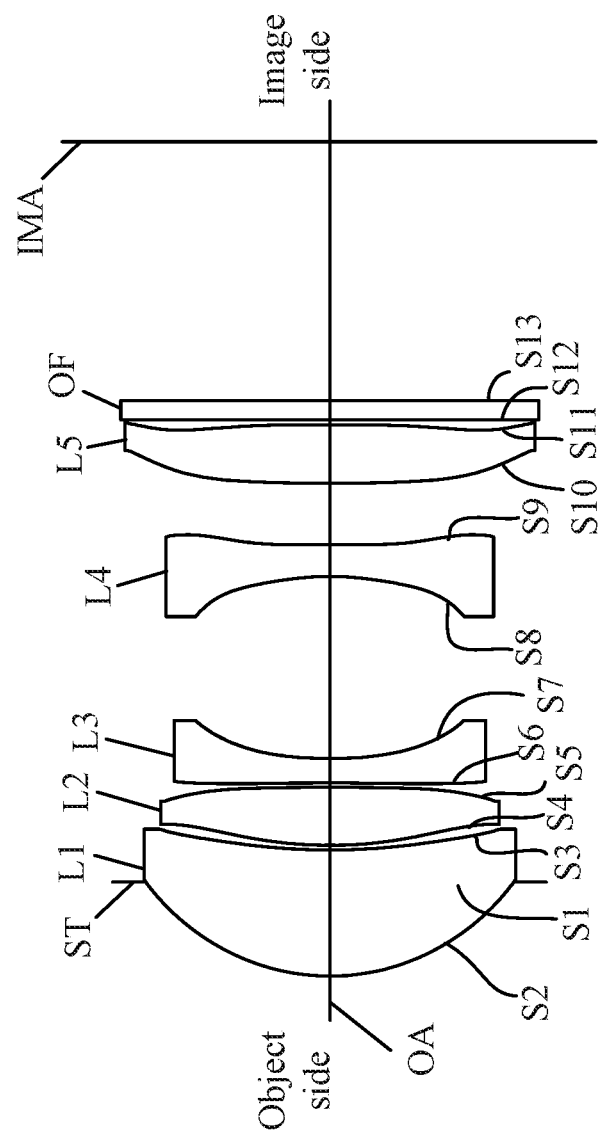
FIG. 1 is a schematic diagram showing a lens assembly according to a first embodiment of the present disclosure.
Figure 2A:
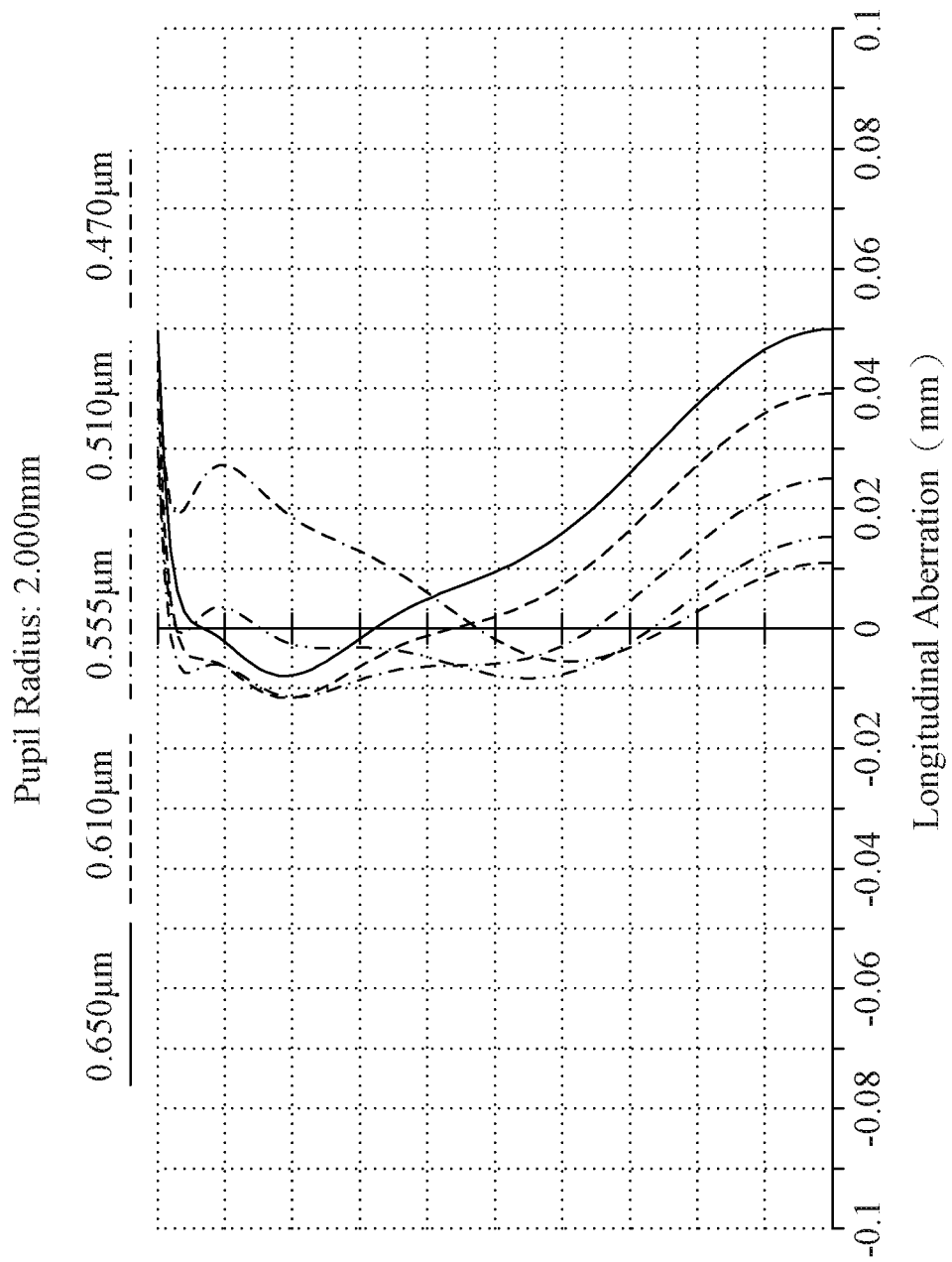
Figure 2B:
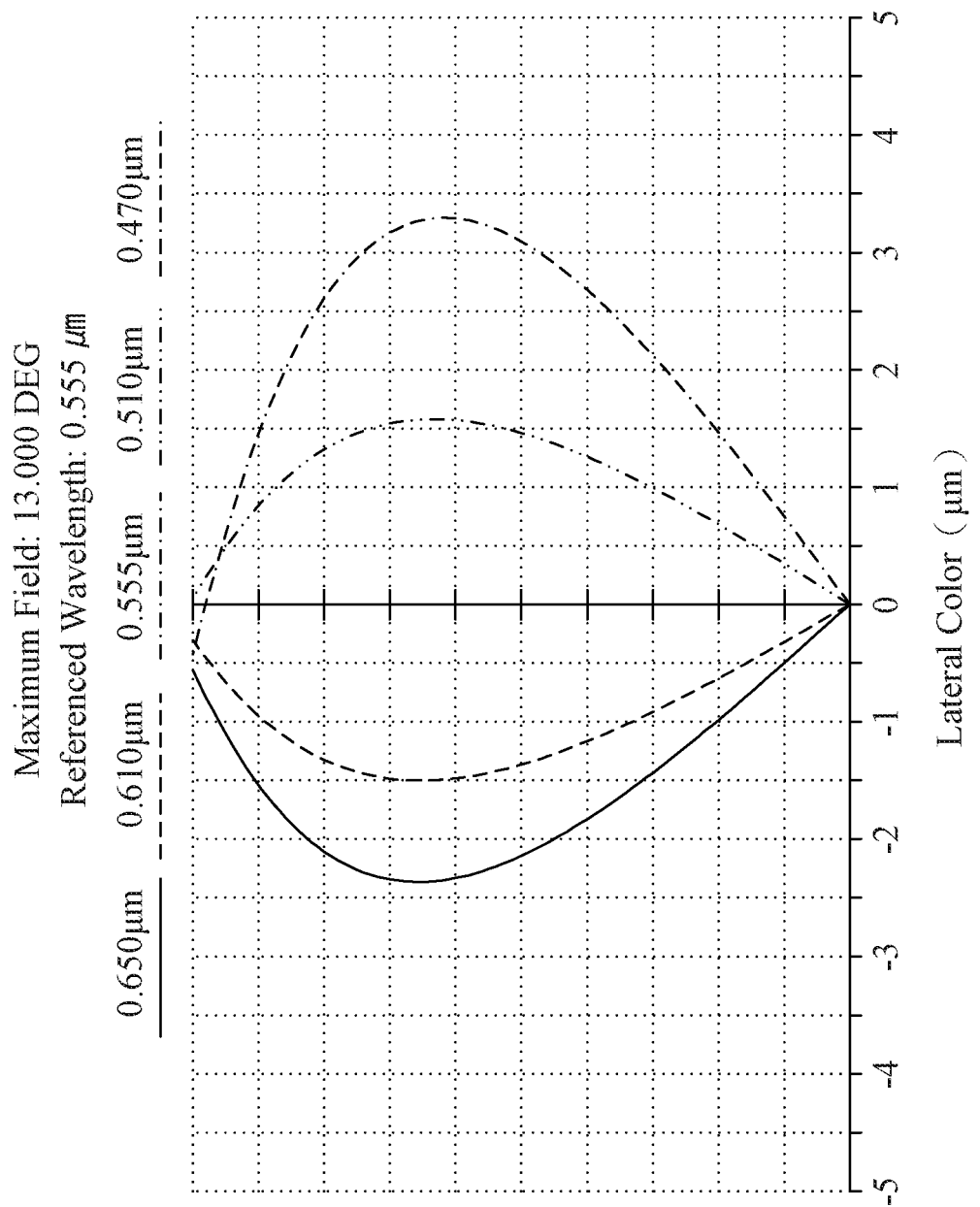
Figure 2E:
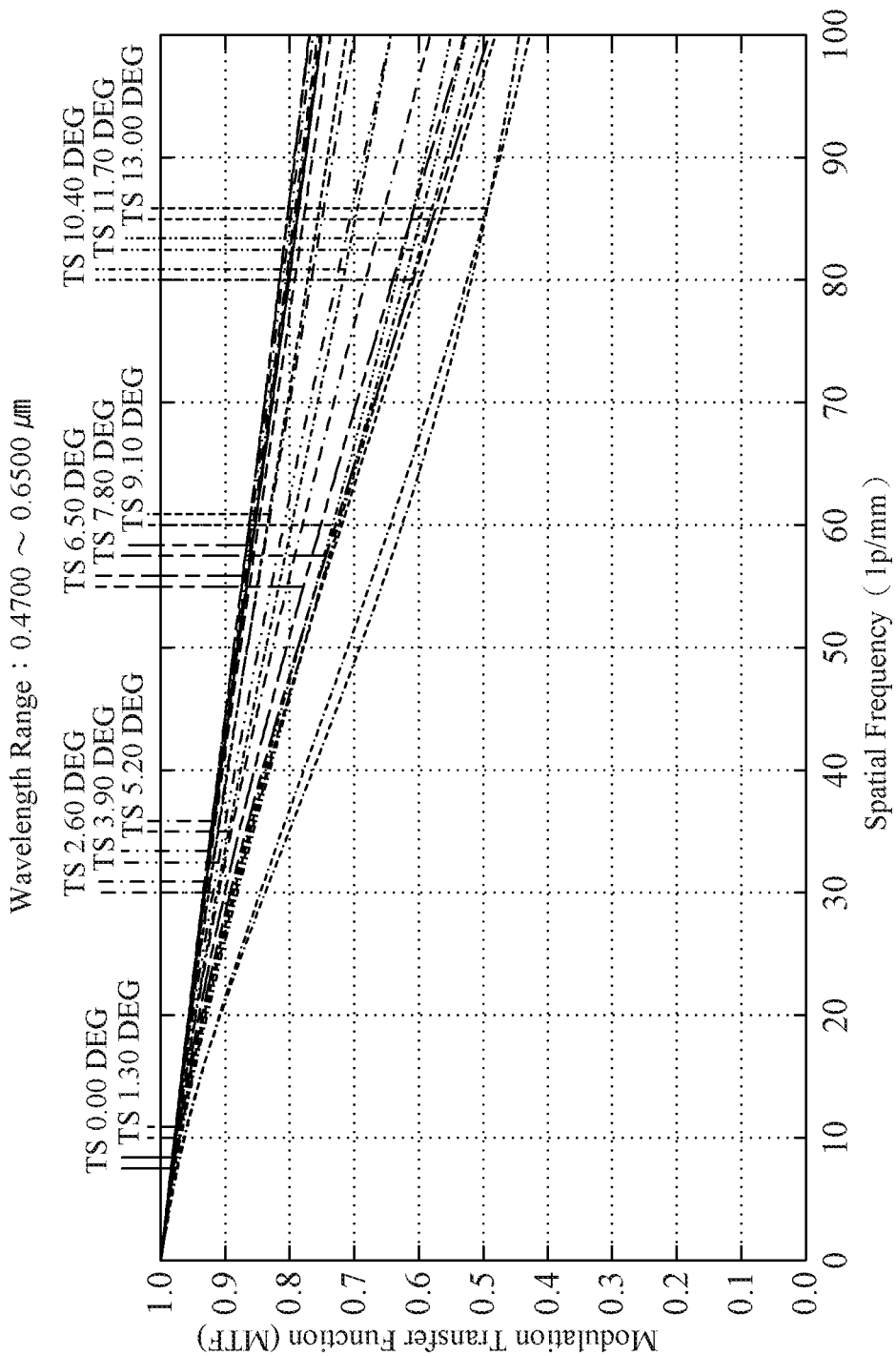
Figure 3:
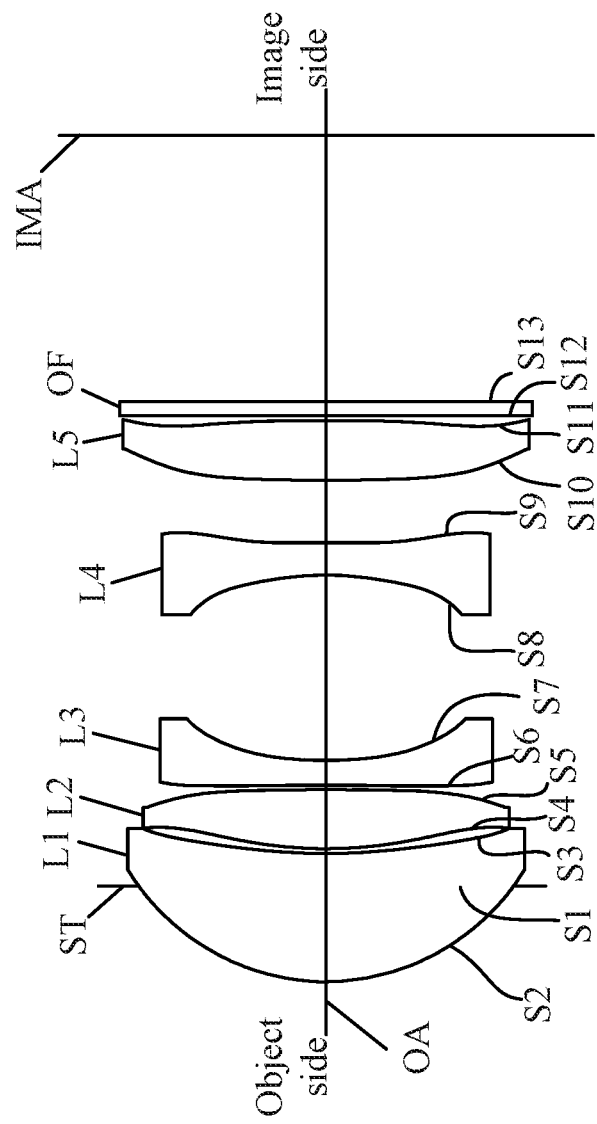
FIG. 3 is a schematic diagram showing a lens assembly according to a second embodiment of the present disclosure.
Figure 4A:
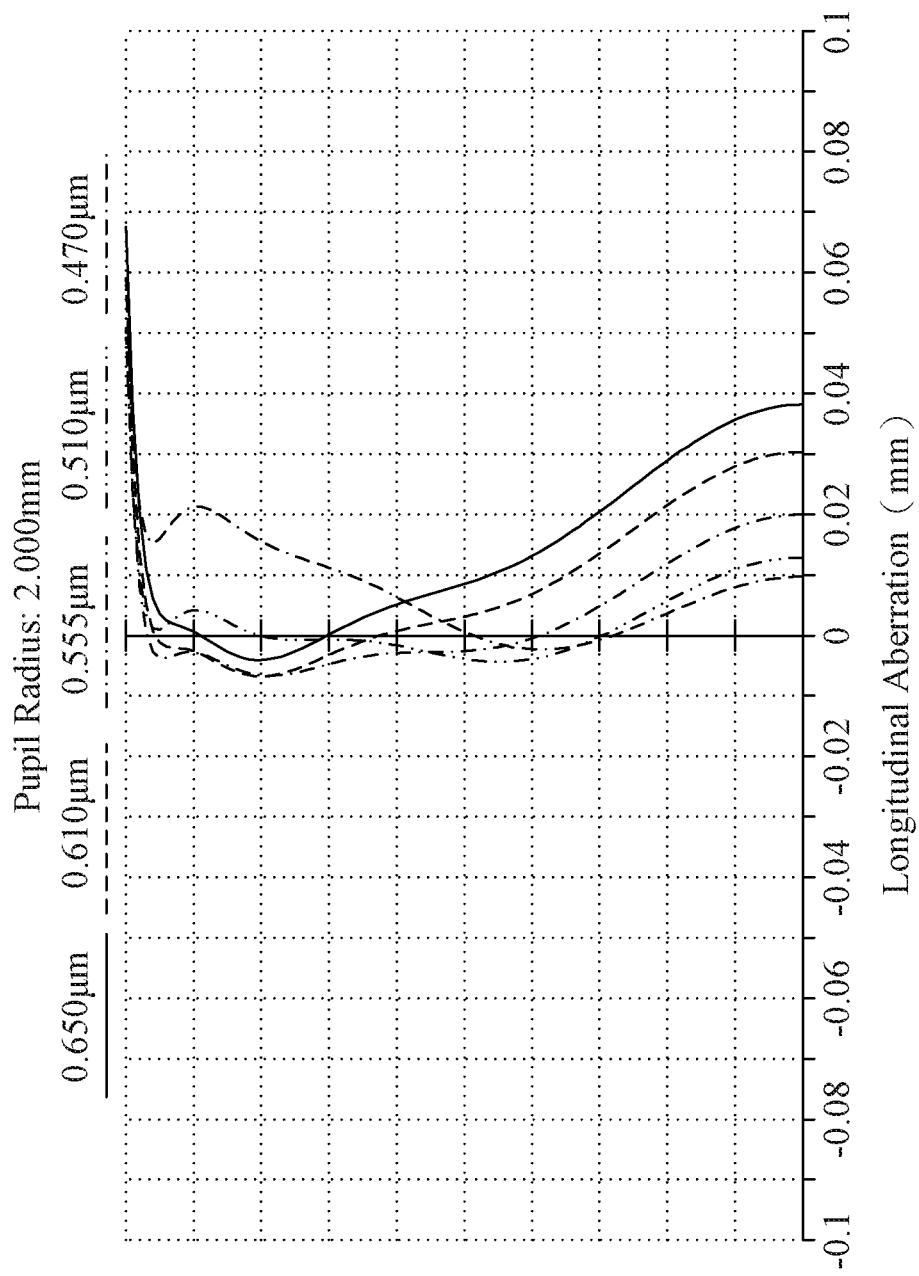
Figure 4B:
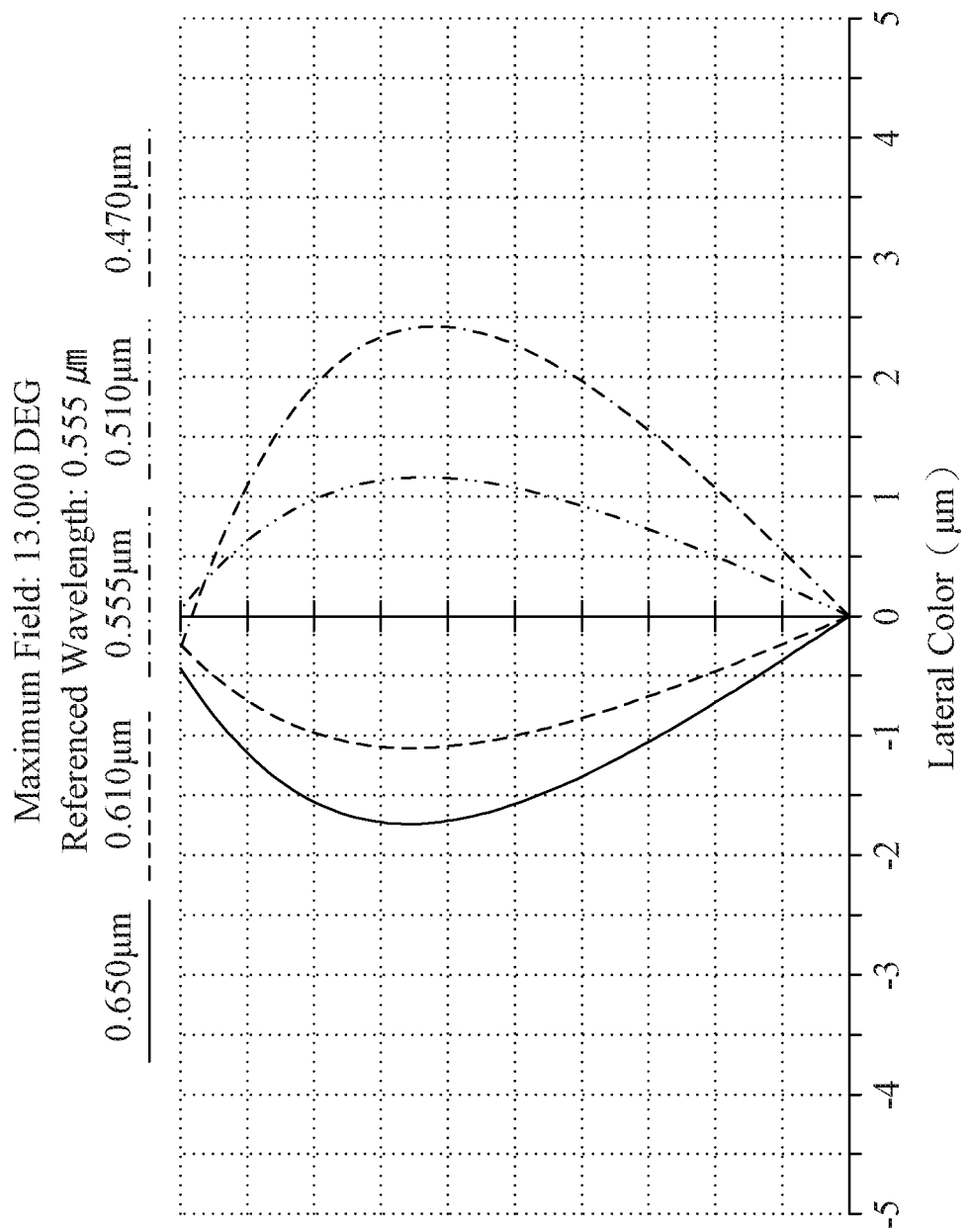
Figure 4E:
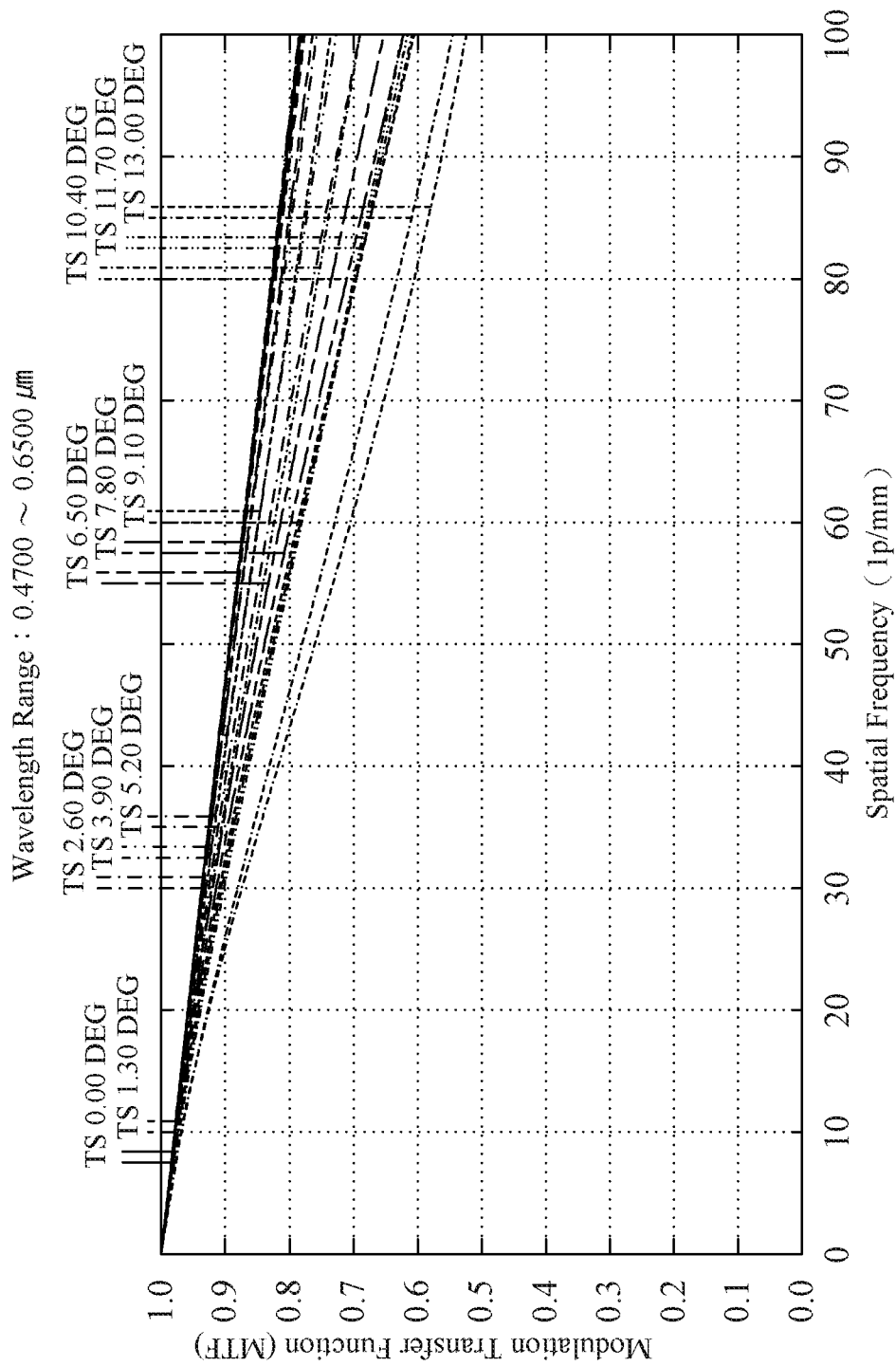
Figure 5:
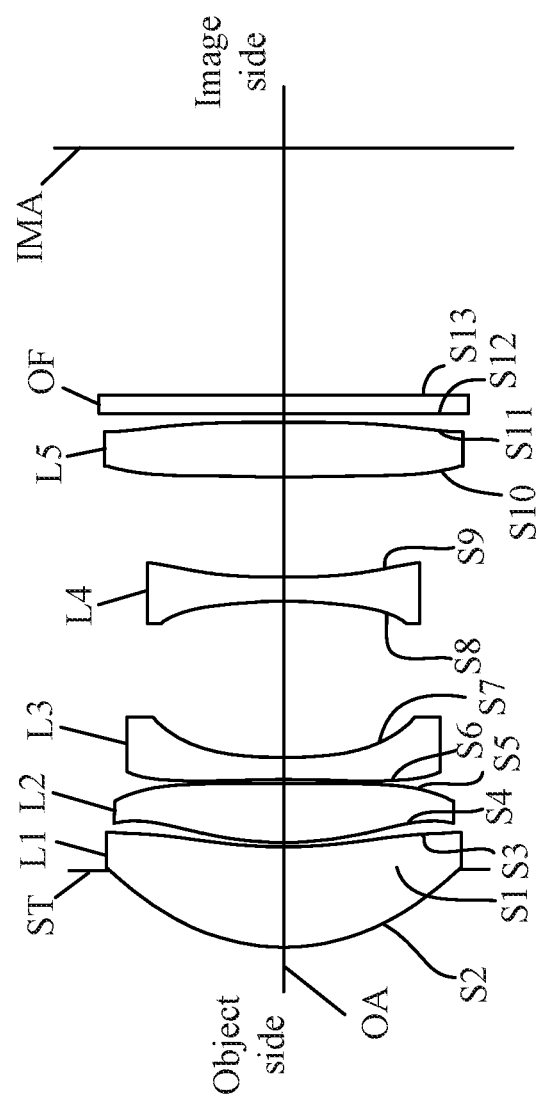
FIG. 5 is a schematic diagram showing a lens assembly according to a third embodiment of the present disclosure.
Figure 6A:
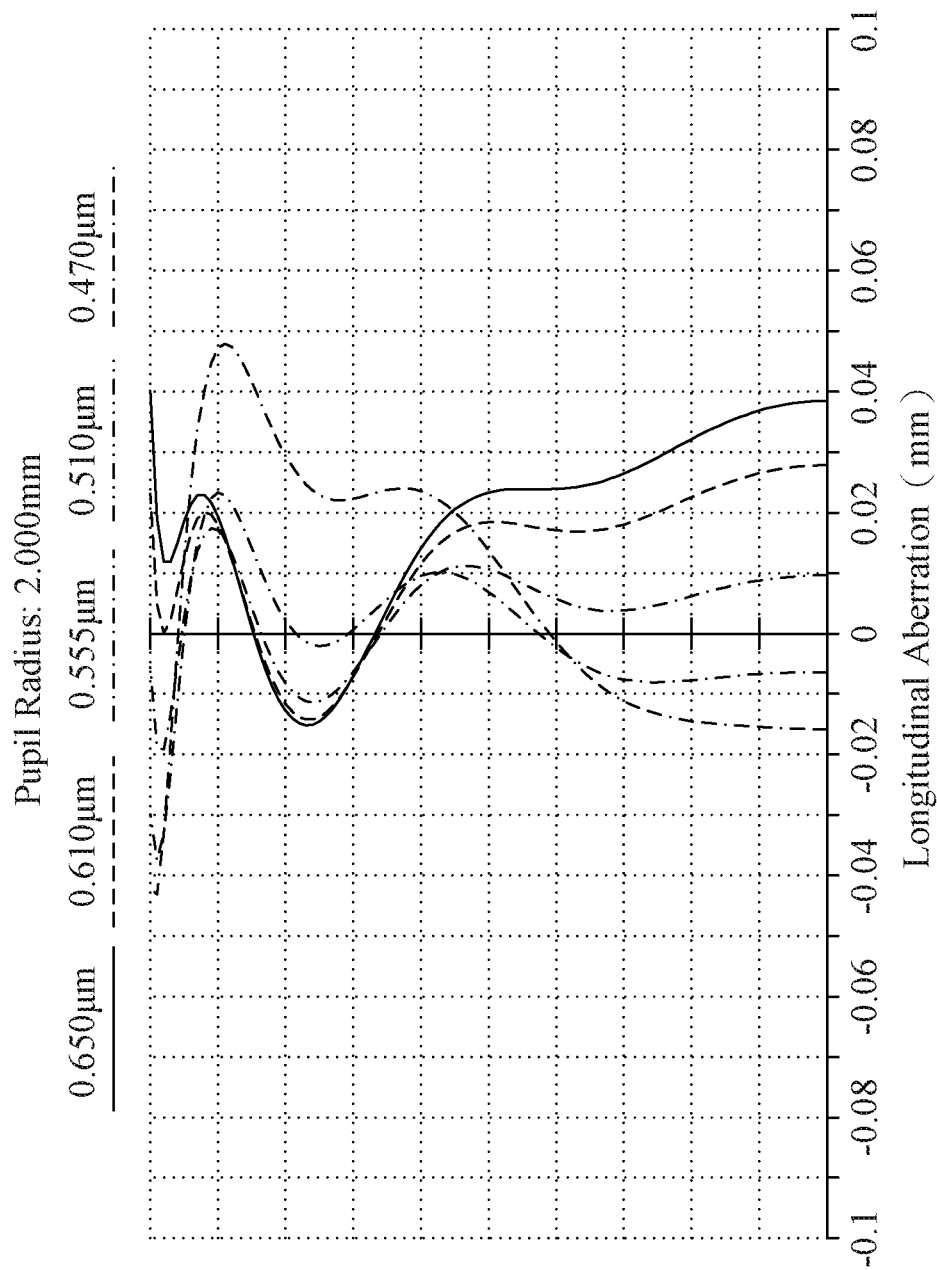
Figure 6B:
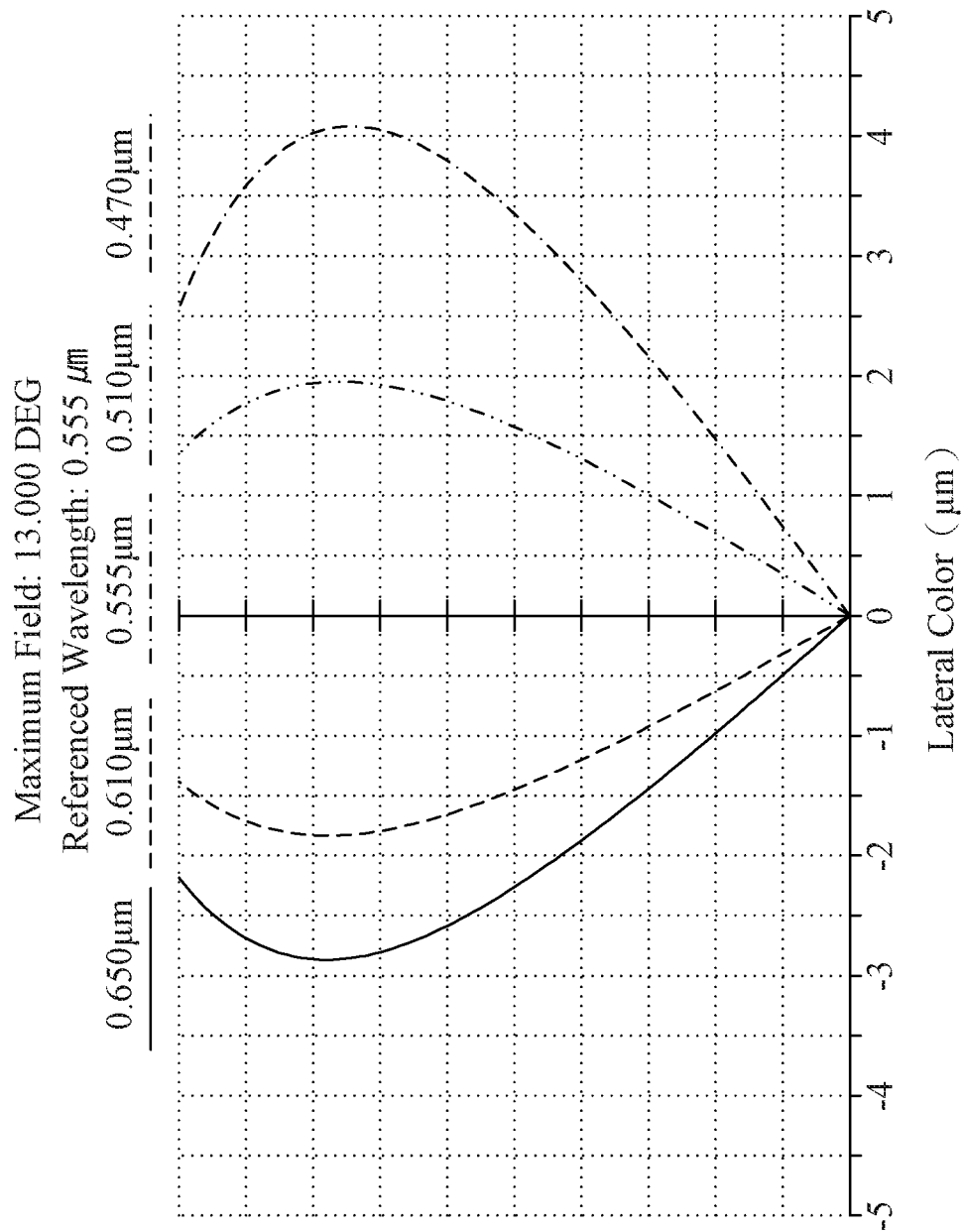
Figure 6E:
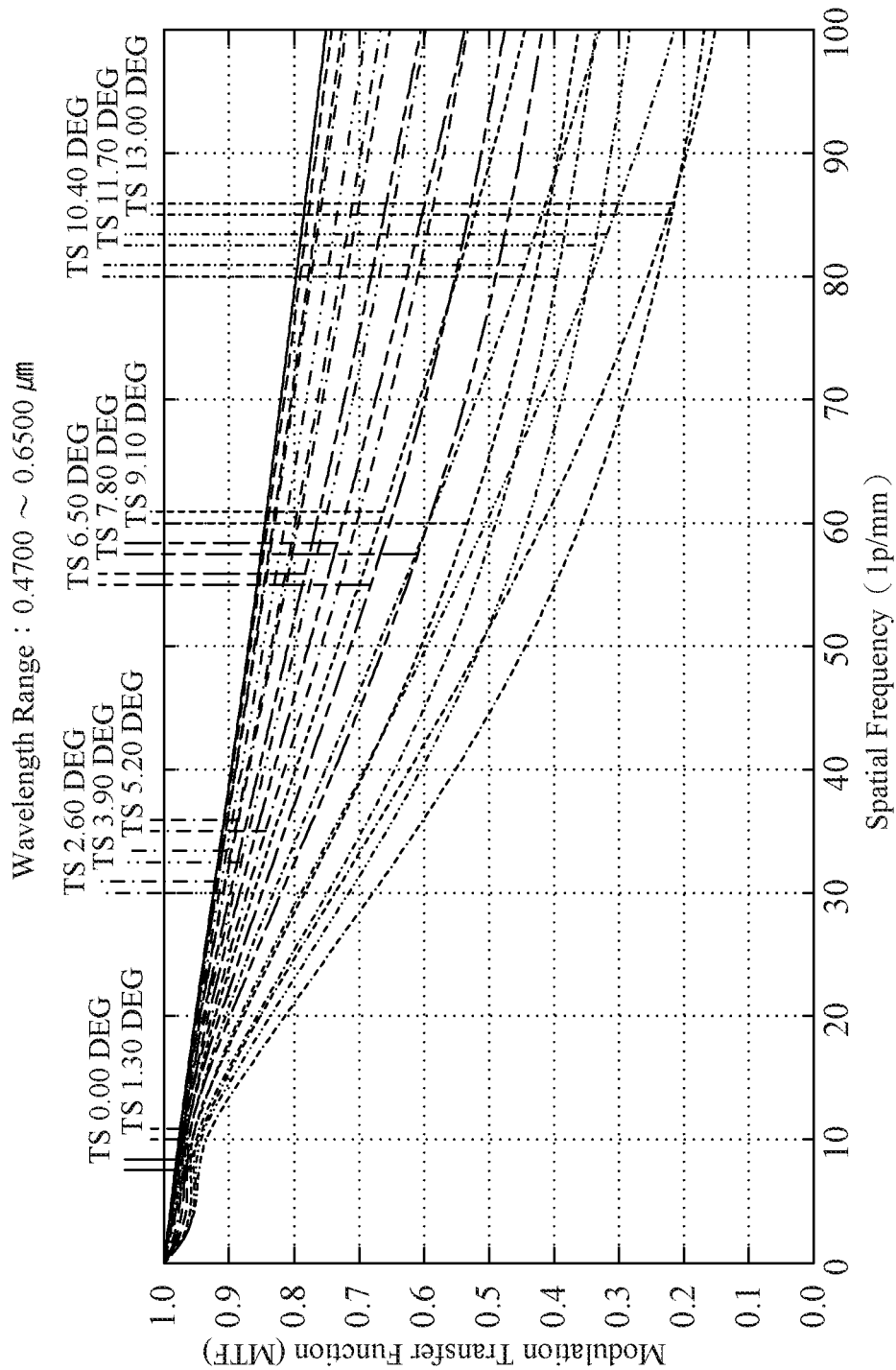

Basic structures of the lens assembly of the present disclosure are shown in FIG. 1 (corresponding to a first embodiment), FIG. 3 (corresponding to a second embodiment), and FIG. 5 (corresponding to a third embodiment), respectively. As shown in FIGS. 1, 3, and 5, the lens assembly includes a first lens L1, a second lens L2, a third lens L3, a fourth lens L4, and a fifth lens L5 in order from an object side to an image side along an optical axis OA. The total number of lenses of the lens assembly is five. In addition, the lens assembly further includes an aperture stop ST located between the object side and the second lens L2 and an optical filter OF located between the fifth lens L5 and an image plane IMA.

The first lens L1 is a meniscus lens with positive refractive power. An object-side surface S2 of the first lens L1 is convex in a paraxial region thereof. An image-side surface S3 of the first lens L1 is concave in a paraxial region thereof. The curvature of the object-side surface S2 of the first lens L1 is greater than the curvature of the image-side surface S3 of the first lens L1. In such a way, the total length of the lens assembly can be reduced. Both of the two surfaces S2 and S3 can be aspheric surfaces for correcting aberration.

The second lens L2 is a convex lens with positive refractive power. An object-side surface S4 of the second lens L2 is convex in a paraxial region thereof. An image-side surface S5 of the second lens L2 can be slightly convex or concave, or a just flat plane. The object-side surface S4 of the second lens L2 is protruded toward the object side in a central region thereof and the degree of protrusion decreases along two sides (i.e., a top side and a bottom side). At the two ends away from the optical axis OA, however, the degree of protrusion slightly increases. Both of the two surfaces S4 and S5 of the second lens L2 can be aspheric surfaces.

The third lens L3 is a lens with negative refractive power. An image-side surface S7 of the third lens L3 is concave in a paraxial region thereof. The curvature of an object-side surface S6 of the third lens L3 is relatively small. At least one of the two surfaces S6 and S7 of the third lens L3 is an aspheric surface.

The fourth lens L4 is a lens with negative refractive power. An object-side surface S8 of the fourth lens L4 is concave in a paraxial region thereof. The curvature of an image-side surface S9 of the fourth lens L4 is relatively small. At least one of the two surfaces S8 and S9 of the fourth lens L4 is an aspheric surface. The image-side surface S7 of the third lens L3 and the object-side surface S8 of the fourth lens L4 are concave surfaces opposite to each other.

The fifth lens L5 is a lens with positive refractive power. Both of an object-side surface S10 and an image-side surface S11 of the fifth lens L5 can be aspheric surfaces. The object-side surface S10 of the fifth lens L5 can be convex in a paraxial region thereof. The image-side surface S11 of the fifth lens L5 can be convex or concave in a paraxial region thereof.

All of the first lens L1, the second lens L2, the third lens L3, the fourth lens L4, and the fifth lens L5 of the lens assembly can be made of a plastic material. Both of the object-side surface and the image-side surface of each of the lenses L1 to L5 can be aspheric surfaces.

The total length of the lens assembly of the present disclosure satisfies the following mathematical equation (1):

$$0 < \frac{TTL}{EFL} < 1, \quad (1)$$

wherein TTL is the total length of the lens assembly and EFL is an effective focal length of the lens assembly. The total length of the lens assembly is a distance between the object-side surface S2 of the first lens L1 and the image plane IMA along the optical axis OA. In such a way, the present disclosure can effectively control the total length of the lens assembly, keeping it small in size.

Further, the lens assembly of the present disclosure also satisfies the following mathematical equation (2):

$$0.2 < \frac{BFL}{TTL} < 1, \quad (2)$$

wherein BFL is a distance between the image-side surface S11 of the fifth lens L5 and the image plane IMA along the optical axis OA.

Further, in order to enable the lens assembly of the present disclosure to possess an excellent optical performance, the lens assembly satisfies the following condition (3):

$$0.2 < \left|\frac{f_1}{EFL}\right| < 1, \quad (3)$$

wherein $f_1$ is a focal length of the first lens L1. That is, an absolute value of a ratio of the focal length of the first lens L1 to the effective focal length EFL of the lens assembly is ranged from 0.2 to 1.

In order to further improve the optical performance, the lens assembly may satisfy the following condition (4):

$$2.0 < \left|\frac{v_1}{v_5}\right| < 3.0, \quad (4)$$

wherein $v_1$ is an Abbe number of the first lens L1 and $v_5$ is an Abbe number of the fifth lens L5.

When the lens assembly satisfies at least one of above conditions (1) to (4), the total length of the lens assembly is effectively reduced, aberration is corrected, and the resolution of the lens assembly is effectively improved.

The lens assembly of the present disclosure is characterized by a long focal length. With telescopic capability, the lens assembly can also reduce aberration, improve resolution, effectively control the total length, and meet the requirements of small size.

The lens assembly provided in the present disclosure will be further described in details with reference to the following three embodiments. Please refer to FIG. 1, FIG. 3, and FIG. 5, which correspond to the first embodiment, the second embodiment, and the third embodiment of the lens assembly of the present disclosure, respectively.

The shape of an aspheric lens can be expressed by the following formula:

$$D = \frac{C \cdot H^2}{1 + \sqrt{1 - (1+K) \cdot C^2 \cdot H^2}} + E_4 H^4 + E_6 H^6 + E_8 H^8 + E_{10} H^{10} + E_{12} H^{12} + E_{14} H^{14} + E_{16} H^{16}$$

wherein D represents the sag of a point on the aspheric surface at a height distanced to a central axis of the lens; C is a reciprocal of a paraxial curvature radius; H represents a height of a point on the aspheric surface with respect to the central axis; K is the conic constant of the aspheric lens; and $E_4$ to $E_{16}$ are aspheric surface coefficients for even (greater than or equal to four) order terms.

First Embodiment

Referring to FIG. 1 and FIGS. 2A to 2E, FIG. 1 is a schematic diagram showing a lens assembly according to a first embodiment of the present disclosure and FIGS. 2A to 2E are diagrams illustrating longitudinal aberration, lateral color, field curvature, distortion, and modulation transfer function (MTF) according to the first embodiment of the present disclosure, respectively. In the first embodiment, the lens assembly includes first to fifth lenses (L1 to L5) in order from the object side to the image side along the optical axis. The first lens L1 is a meniscus lens having an object-side surface S2 being convex in a paraxial region thereof and an image-side surface S3 being concave in a paraxial region thereof. The first lens L1 has a positive refractive power. The second lens L2 is a convex lens having an object-side surface S4 being convex in a paraxial region thereof and an image-side surface S5 being convex in a paraxial region thereof. The second lens L2 has a positive refractive power. An image-side surface S7 of the third lens L3 and an object-side surface L8 of the fourth lens L4 are concave surfaces opposite to each other. An object-side surface S6 of the third lens L3 is concave and an image-side surface S9 of the fourth lens L4 is convex. Both of the first lens L3 and the fourth lens L4 have a negative refractive power. Both of an object-side surface S10 and an image-side surface S11 of the fifth lens L5 are convex in paraxial regions thereof. The fifth lens L5 has a positive refractive power. In this embodiment, all of the image-side surfaces S5, S9, and S11 of the second lens L2, the fourth lens L4, and the fifth lens L5 are convex surfaces.

In Table 1, related parameters of each lens of the lens assembly shown in FIG. 1 are illustrated. In the lens assembly, the effective focal length (EFL) is 11.0 mm, F-number is 2.75, and the total length is 9.0 mm.

TABLE 1

| Surface Index | Radius of Curvature R (mm) | Thickness/ Distance D (mm) | Refractive Index Nd | Abbe No. Vd |
|---|---|---|---|---|
| S1 (aperture stop) | Infinity | −1.013 | | |
| S2 | 2.391 | 1.361 | 1.515 | 56.96 |
| S3 | 7.069 | 0.050 | | |
| S4 | 4.779 | 0.625 | 1.515 | 56.96 |
| S5 | −52.173 | 0.050 | | |
| S6 | −20.272 | 0.262 | 1.640 | 23.53 |
| S7 | 4.707 | 1.966 | | |
| S8 | −2.894 | 0.342 | 1.544 | 55.95 |
| S9 | −20.141 | 0.661 | | |
| S10 | 17.468 | 0.633 | 1.640 | 23.53 |
| S11 | −169.172 | 0.050 | | |
| S12 | Infinity | 0.210 | 1.517 | 64.17 |
| S13 | Infinity | 2.790 | | |

In Table 2, related parameters of aspheric surfaces of each lens of the lens assembly in Table 1 are illustrated.

TABLE 2

| Surface Index | K | E4 | E6 | E8 |
|---|---|---|---|---|
| S2 | 1.36E−02 | −2.05E−03 | −9.63E−05 | −6.15E−05 |
| S3 | 0 | 2.83E−03 | −5.11E−03 | 1.12E−03 |
| S4 | 1.59E+00 | 7.31E−03 | −8.97E−03 | 7.07E−04 |
| S5 | 0 | −1.36E−03 | −5.51E−03 | 7.25E−04 |
| S6 | 0 | 1.88E−02 | −3.86E−03 | −8.51E−04 |
| S7 | 8.31E+00 | 2.93E−02 | −5.13E−04 | −3.53E−03 |
| S8 | 0 | 8.69E−02 | −5.99E−02 | 1.38E−02 |
| S9 | 0 | 9.79E−02 | −3.02E−02 | −4.79E−02 |
| S10 | 0 | −1.40E−02 | 1.28E−02 | −1.24E−03 |
| S11 | 0 | −2.69E−02 | 1.07E−02 | −2.79E−03 |

| Surface Index | E10 | E12 | E14 | E16 |
|---|---|---|---|---|
| S2 | 0 | 0 | 0 | 0 |
| S3 | 0 | 0 | 0 | 0 |
| S4 | 0 | 0 | 0 | 0 |
| S5 | 0 | 0 | 0 | 0 |
| S6 | 4.34E−04 | 0 | 0 | 0 |
| S7 | 5.93E−04 | 0 | 0 | 0 |
| S8 | −5.17E−03 | 8.14E−04 | 0 | 0 |
| S9 | 3.26E−03 | −4.13E−04 | 0 | 0 |
| S10 | −5.24E−04 | 1.54E−04 | −1.30E−05 | 0 |
| S11 | 9.67E−04 | −1.71E−04 | 9.89E−06 | 0 |

In this embodiment, the total length of the lens assembly is 9.0 mm, the effective focal length is 11.0 mm, and BFL is 3.05 mm. TTL/EFL is 0.818 (i.e., greater than 0 and less than 1) and BFL/TTL is 0.339 (i.e., greater than 0.2 and less than 1), which satisfy above conditions (1) and (2). The focal length $f_1$ of the first lens L1 is 6.368 mm. The absolute value of $f_1$/EFL is 0.579 mm (i.e., between 0.2 and 1), which satisfies above condition (3). The Abbe number $v_1$ of the first lens L1 is 56.96 and the Abbe number $v_5$ of the fifth lens L5 is 23.53. The absolute value of their ratio is 2.421 (i.e., between 2 and 3), which satisfies above condition (4).

If the value of TTL/EFL (i.e., condition (1)) is greater than 1, it is difficult to achieve a small-size camera. Accordingly, the value of TTL/EFL has to be at least less than 1.

$$0 < \frac{TTL}{EFL} < 1$$

is a preferable range. This range is an inevitable condition that leads to an optimized small-size camera.

Second Embodiment

Referring to FIG. 3 and FIGS. 4A to 4E, FIG. 3 is a schematic diagram showing a lens assembly according to a second embodiment of the present disclosure and FIGS. 4A to 4E are diagrams illustrating longitudinal aberration, lateral color, field curvature, distortion, and modulation transfer function (MTF) according to the second embodiment of the present disclosure, respectively. In the second embodiment, the lens assembly includes first to fifth lenses (L1 to L5) in order from the object side to the image side along the optical axis. The first lens L1 is a meniscus lens having an object-side surface S2 being convex in a paraxial region thereof and an image-side surface S3 being concave in a paraxial region thereof. The first lens L1 has a positive refractive power. The second lens L2 is a convex lens having an object-side surface S4 being convex in a paraxial region thereof and an image-side surface S5 being convex in a paraxial region thereof. The second lens L2 has a positive refractive power. An image-side surface S7 of the third lens L3 and an object-side surface L8 of the fourth lens L4 are concave surfaces opposite to each other. An object-side surface S6 of the third lens L3 is concave and an image-side surface S9 of the fourth lens L4 is convex. Both of the first lens L3 and the fourth lens L4 have a negative refractive power. Both of an object-side surface S10 and an image-side surface S11 of the fifth lens L5 are convex in paraxial regions thereof. The fifth lens L5 has a positive refractive power. In this embodiment, all of the image-side surfaces S5, S9, and S11 of the second lens L2, the fourth lens L4, and the fifth lens L5 are convex surfaces.

In Table 3, related parameters of each lens of the lens assembly shown in FIG. 3 are illustrated. In the lens assembly, the effective focal length (EFL) is 8.0 mm, F-number is 2.72, and the total length is 6.534 mm.

TABLE 3

| Surface Index | Radius of Curvature R (mm) | Thickness/ Distance D (mm) | Refractive Index Nd | Abbe No. Vd |
|---|---|---|---|---|
| S1 (aperture stop) | Infinity | −0.737 | | |
| S2 | 1.740 | 0.991 | 1.515 | 56.96 |
| S3 | 5.144 | 0.036 | | |
| S4 | 3.477 | 0.455 | 1.515 | 56.96 |
| S5 | −37.963 | 0.036 | | |
| S6 | −14.751 | 0.190 | 1.640 | 23.53 |
| S7 | 3.425 | 1.430 | | |
| S8 | −2.106 | 0.249 | 1.544 | 55.95 |
| S9 | −14.656 | 0.481 | | |
| S10 | 12.711 | 0.460 | 1.640 | 23.53 |
| S11 | −123.097 | 0.036 | | |
| S12 | Infinity | 0.11 | 1.517 | 64.17 |
| S13 | Infinity | 2.060 | | |

In Table 4, related parameters of aspheric surfaces of each lens of the lens assembly in Table 3 are illustrated.

TABLE 4

| Surface Index | K | E4 | E6 | E8 |
|---|---|---|---|---|
| S2 | 1.36E−02 | −5.31E−03 | −4.72E−04 | −5.70E−04 |
| S3 | 0 | 7.34E−03 | −2.51E−02 | 1.04E−02 |
| S4 | 1.59E+00 | 1.90E−02 | −4.40E−02 | 6.55E−03 |

TABLE 4-continued

| | | | | |
|---|---|---|---|---|
| S5 | 0 | −3.54E−03 | −2.70E−02 | 6.72E−03 |
| S6 | 0 | 4.87E−02 | −1.89E−02 | −7.88E−03 |
| S7 | 8.31E+00 | 7.59E−02 | −2.51E−03 | −3.27E−02 |
| S8 | 0 | 2.26E−01 | −2.94E−01 | 1.28E−01 |
| S9 | 0 | 2.54E−01 | −1.48E−01 | −4.44E−02 |
| S10 | 0 | −3.63E−02 | 6.27E−02 | −1.15E−02 |
| S11 | 0 | −6.99E−02 | 5.26E−02 | −2.59E−02 |

| Surface Index | E10 | E12 | E14 | E16 |
|---|---|---|---|---|
| S2 | 0 | 0 | 0 | 0 |
| S3 | 0 | 0 | 0 | 0 |
| S4 | 0 | 0 | 0 | 0 |
| S5 | 0 | 0 | 0 | 0 |
| S6 | 7.59E−03 | 0 | 0 | 0 |
| S7 | 1.04E−02 | 0 | 0 | 0 |
| S8 | −9.04E−02 | 2.69E−02 | 0 | 0 |
| S9 | 5.70E−02 | −1.36E−02 | 0 | 0 |
| S10 | −9.17E−03 | 5.08E−03 | −8.09E−04 | 0 |
| S11 | 1.69E−02 | −5.66E−03 | 6.17E−04 | 0 |

In this embodiment, the total length of the lens assembly is 6.534 mm, the effective focal length is 8.0 mm, and BFL is 2.206 mm. TTL/EFL is 0.817 (i.e., greater than 0 and less than 1) and BFL/TTL is 0.338 (i.e., greater than 0.2 and less than 1), which satisfy above conditions (1) and (2). The focal length $f_1$ of the first lens L1 is 4.633 mm. The absolute value of $f_1$/EFL is 0.579 mm (i.e., between 0.2 and 1), which satisfies above condition (3). The Abbe number $v_1$ of the first lens L1 is 56.96 and the Abbe number $v_5$ of the fifth lens L5 is 23.53. The absolute value of their ratio is 2.421 (i.e., between 2 and 3), which satisfies above condition (4).

If the value of BFL/TTL (i.e., condition (2)) is less than 0.2, it is difficult to achieve a small-size camera. Accordingly, the value of BFL/TTL has to be at least greater than 0.2.

$$0.2 < \frac{BFL}{TTL} < 1$$

is a preferable range. This range is an inevitable condition that leads to an optimized small-size camera.

Third Embodiment

Referring to FIG. 5 and FIGS. 6A to 6E, FIG. 5 is a schematic diagram showing a lens assembly according to a third embodiment of the present disclosure and FIGS. 6A to 6E are diagrams illustrating longitudinal aberration, lateral color, field curvature, distortion, and modulation transfer function (MTF) according to the third embodiment of the present disclosure, respectively. In the third embodiment, the lens assembly includes first to fifth lenses (L1 to L5) in order from the object side to the image side along the optical axis. The first lens L1 is a meniscus lens having an object-side surface S2 being convex in a paraxial region thereof and an image-side surface S3 being concave in a paraxial region thereof. The first lens L1 has a positive refractive power. The second lens L2 is a convex lens having an object-side surface S4 being convex in a paraxial region thereof and an image-side surface S5 being concave in a paraxial region thereof. The second lens L2 has a positive refractive power. An image-side surface S7 of the third lens L3 and an object-side surface L8 of the fourth lens L4 are concave surfaces opposite to each other. An object-side surface S6 of the third lens L3 is concave and an image-side surface S9 of the fourth lens L4 is concave. Both of the first lens L3 and the fourth lens L4 have a negative refractive power. An object-side surface S10 of the fifth lens L5 is convex in a paraxial region thereof and an image-side surface S11 of the fifth lens L5 is concave in a paraxial region thereof. The fifth lens L5 has a positive refractive power. In this embodiment, all of the image-side surfaces S5, S9, and S11 of the second lens L2, the fourth lens L4, and the fifth lens L5 are concave surfaces.

In Table 5, related parameters of each lens of the lens assembly shown in FIG. 5 are illustrated. In the lens assembly, the effective focal length (EFL) is 11.0 mm, F-number is 2.7, and the total length is 9.0 mm.

TABLE 5

| Surface Index | Radius of Curvature R (mm) | Thickness/ Distance D (mm) | Refractive Index Nd | Abbe No. Vd |
|---|---|---|---|---|
| S1 (aperture stop) | Infinity | −0.894 | | |
| S2 | 2.395 | 1.130 | 1.544 | 55.95 |
| S3 | 5.427 | 0.050 | | |
| S4 | 4.083 | 0.659 | 1.544 | 55.95 |
| S5 | 84.737 | 0.049 | | |
| S6 | −13.241 | 0.249 | 1.636 | 23.97 |
| S7 | 5.950 | 1.761 | | |
| S8 | −5.065 | 0.271 | 1.544 | 55.95 |
| S9 | 13.642 | 1.130 | | |
| S10 | 20.627 | 0.613 | 1.636 | 23.97 |
| S11 | 281.873 | 0.100 | | |
| S12 | Infinity | 0.210 | 1.517 | 64.17 |
| S13 | Infinity | 2.782 | | |

In Table 6, related parameters of aspheric surfaces of each lens of the lens assembly in Table 5 are illustrated.

TABLE 6

| Surface Index | K | E4 | E6 | E8 |
|---|---|---|---|---|
| S2 | −1.87E−01 | −6.61E−03 | 2.46E−03 | −6.29E−04 |
| S3 | 0 | −6.25E−03 | −5.80E−03 | 1.01E−03 |
| S4 | 9.27E−01 | 7.86E−03 | −1.11E−02 | 7.96E−04 |
| S5 | 0 | −4.42E−03 | −4.58E−03 | 3.61E−04 |
| S6 | 0 | 2.54E−02 | −1.58E−03 | −1.92E−03 |
| S7 | 1.23E+01 | 3.30E−02 | 2.14E−02 | −1.64E−02 |
| S8 | 0 | 4.27E−02 | −3.95E−02 | 9.15E−03 |
| S9 | 0 | 5.42E−02 | −2.58E−02 | 6.99E−03 |
| S10 | 0 | −1.78E−02 | 6.69E−03 | 1.03E−05 |
| S11 | 0 | −2.45E−02 | 7.17E−03 | −1.73E−03 |

| Surface Index | E10 | E12 | E14 | E16 |
|---|---|---|---|---|
| S2 | 0 | 0 | 0 | 0 |
| S3 | 0 | 0 | 0 | 0 |
| S4 | 0 | 0 | 0 | 0 |
| S5 | 0 | 0 | 0 | 0 |
| S6 | 6.51E−04 | 0 | 0 | 0 |
| S7 | 3.88E−03 | 0 | 0 | 0 |
| S8 | −1.26E−03 | −5.58E−04 | 0 | 0 |
| S9 | −1.94E−03 | 2.32E−04 | 0 | 0 |
| S10 | −2.28E−04 | 4.38E−05 | −3.89E−06 | 0 |
| S11 | 4.24E−04 | −4.12E−05 | 1.17E−08 | 0 |

In this embodiment, the total length of the lens assembly is 9.0 mm, the effective focal length is 11.0 mm, and BFL is 3.092 mm. TTL/EFL is 0.818 (i.e., greater than 0 and less than 1) and BFL/TTL is 0.344 (i.e., greater than 0.2 and less than 1), which satisfy above conditions (1) and (2). The focal length $f_1$ of the first lens L1 is 6.942 mm. The absolute value of $f_1$/EFL is 0.631 mm (i.e., between 0.2 and 1), which satisfies above condition (3). The Abbe number $v_1$ of the first lens L1 is 55.95 and the Abbe number $v_5$ of the fifth lens L5 is 23.97. The absolute value of their ratio is 2.334 (i.e., between 2 and 3), which satisfies above condition (4).

If the absolute value of $f_1$/EFL (i.e., condition (3)) is greater than 1, it is difficult to provide a sufficient large refractive power. Accordingly, the absolute value of $f_1$/EFL has to be at least less than 1.

$$0.2 < \left|\frac{f_1}{EFL}\right| < 1$$

is a preferable range. This range is an inevitable condition to provide a sufficient large refractive power.

If the absolute value of $v_1/v_5$ (i.e., condition (4)) is less than 2, the ability to reduce chromatic aberration may get worse. Accordingly, the absolute value of $v_1/v_5$ has to be at least greater than 2.

$$2 < \left|\frac{v_1}{v_5}\right| < 3$$

is a preferable range. This range is an inevitable condition to have a great ability to reduce chromatic aberration.

The lens assembly of the present disclosure meets various conditions, which are emphasized particularly by $$0 < \frac{TTL}{EFL} < 1, 0.2 < \frac{BFL}{TTL} < 1, 0.2 < \left|\frac{f_1}{EFL}\right| < 1, \text{ and } 2 < \left|\frac{v_1}{v_5}\right| < 3.$$

The formulas $$0 < \frac{TTL}{EFL} < 1 \text{ and } 0.2 < \frac{BFL}{TTL} < 1$$

are helpful in achieving a small-size camera. The formula $$0.2 < \left|\frac{f_1}{EFL}\right| < 1$$

can provide a sufficient large refractive power. The formula $$2 < \left|\frac{v_1}{v_5}\right| < 3$$

leads to a great ability to reduce chromatic aberration.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A lens assembly comprising, in order from an object side to an image side along an optical axis:
a first lens, which is a meniscus lens with positive refractive power;
a second lens, which is a lens with positive refractive power, in which an object-side surface of the second lens is convex;
a third lens, which is a lens with negative refractive power, in which an object-side surface of the third lens is concave and an image-side surface of the third lens is concave;
a fourth lens, which is a meniscus lens with negative refractive power; and
a fifth lens, which is a lens with positive refractive power, in which an object-side surface of the fifth lens is convex,
wherein the lens assembly further comprises an aperture stop disposed between the object side and the second lens;
wherein the lens assembly satisfies the following condition:

$$0 < \frac{TTL}{EFL} < 1,$$

wherein TTL is a total length of the lens assembly and EFL is an effective focal length of the lens assembly, and wherein the object-side surface of the first lens is convex and the image-side surface of the first lens is concave, the object-side surface of the fourth lens is concave.

2. The lens assembly according to claim 1, wherein an image-side surface of the second lens is convex, an image-side surface of the fourth lens is convex, and an image-side surface of the fifth lens is convex.

3. The lens assembly according to claim 1, wherein an image-side surface of the second lens is concave, an image-side surface of the fourth lens is concave, and an image-side surface of the fifth lens is concave.

4. The lens assembly according to claim 1, wherein the image-side surface of the third lens and the object-side surface of the fourth lens are concave surfaces opposite to each other.

5. The lens assembly according to claim 1, wherein the lens assembly further satisfies the following condition:

$$0.2 < \left|\frac{f_1}{EFL}\right| < 1,$$

wherein $f_1$ is a focal length of the first lens and EFL is an effective focal length of the lens assembly.

6. The lens assembly according to claim 1, wherein the lens assembly further satisfies the following condition:

$$2 < \left|\frac{v_1}{v_5}\right| < 3,$$

wherein $v_1$ is an Abbe number of the first lens and $v_5$ is an Abbe number of the fifth lens.

7. The lens assembly according to claim 1, wherein at least one surface of each of the first lens, the second lens, the third lens, the fourth lens, and the fifth lens is an aspheric surface.

8. A lens assembly comprising, in order from an object side to an image side along an optical axis:
- a first lens, which is a meniscus lens with positive refractive power;
- a second lens, which is a lens with positive refractive power, in which an object-side surface of the second lens is convex;
- a third lens, which is a lens with negative refractive power, in which an object-side surface of the third lens is concave and an image-side surface of the third lens is concave;
- a fourth lens, which is a meniscus lens with negative refractive power; and
- a fifth lens, which is a lens with positive refractive power, in which an object-side surface of the fifth lens is convex, wherein the lens assembly satisfies the following condition:

$$0.2 < \frac{BFL}{TTL} < 1,$$

wherein BFL is a distance between an image-side surface of the fifth lens and an image plane along the optical axis and TTL is a total length of the lens assembly.

9. A lens assembly comprising, in order from an object side to an image side along an optical axis:
- a first lens, which is a meniscus lens with positive refractive power;
- a second lens, which is a lens with positive refractive power, in which an object-side surface of the second lens is convex;
- a third lens, which a lens with negative refractive power, in which an object-side surface of the third lens is concave and an image-side surface of the third lens is concave;
- a fourth lens, which is a meniscus lens with negative refractive power; and
- a fifth lens, which is a lens with positive refractive power, in which an object-side surface of the fifth lens is convex, wherein the lens assembly satisfies the following condition:

$$0.2 < \left|\frac{f_1}{EFL}\right| < 1,$$

wherein $f_1$ is a focal length of the first lens and EFL is an effective focal length of the lens assembly.

10. The lens assembly according to claim 9, wherein the object-side surface of the first lens is convex and the image-side surface of the first lens is concave, the object-side surface of the fourth lens is concave.

11. The lens assembly according to claim 10, wherein an image-side surface of the second lens is convex, an image-side surface of the fourth lens is convex, and an image-side surface of the fifth lens is convex.

12. The lens assembly according to claim 10, wherein an image-side surface of the second lens is concave, an image-side surface of the fourth lens is concave, and an image-side surface of the fifth lens is concave.

13. The lens assembly according to claim 10, wherein the image-side surface of the third lens and the object-side surface of the fourth lens are concave surfaces opposite to each other.

14. The lens assembly according to claim 10, wherein the lens assembly further satisfies the following condition:

$$2 < \left|\frac{v_1}{v_5}\right| < 3,$$

wherein $v_1$ is an Abbe number of the first lens and $v_5$ is an Abbe number of the fifth lens.

15. The lens assembly according to claim 10, wherein at least one surface of each of the first lens, the second lens, the third lens, the fourth lens, and the fifth lens is an aspheric surface.

16. The lens assembly according to claim 10, further comprising:
an aperture stop disposed between the object side and the second lens.

17. The lens assembly according to claim 9, wherein the lens assembly further satisfies the following condition:

$$0.2 < \frac{BFL}{TTL} < 1,$$

wherein BFL is a distance between an image-side surface of the fifth lens and an image plane along the optical axis and TTL is a total length of the lens assembly.

18. The lens assembly according to claim 17, wherein the lens assembly further satisfies the following condition:

$$0 < \frac{TTL}{EFL} < 1,$$

wherein TTL is a total length of the lens assembly and EFL is an effective focal length of the lens assembly.

* * * * *